US012802358B2

(12) United States Patent
Xu et al.

(10) Patent No.: US 12,802,358 B2
(45) Date of Patent: Nov. 17, 2026

(54) METHOD AND DEVICE FOR GENERATING CONDYLAR MOVEMENT ENVELOPE SURFACE OF TEMPOROMANDIBULAR JOINT BASED ON FACIAL PARAMETERS

(71) Applicant: PEKING UNIVERSITY SCHOOL AND HOSPITAL OF STOMATOLOGY, Beijing (CN)

(72) Inventors: Xiangliang Xu, Beijing (CN); Chuanbin Guo, Beijing (CN); Kenan Chen, Beijing (CN); Jing Wang, Beijing (CN); Junqi Jiang, Beijing (CN); Junlin Wang, Beijing (CN)

(73) Assignee: PEKING UNIVERSITY SCHOOL AND HOSPITAL OF STOMATOLOGY, Beijing (CN)

( * ) Notice: Subject to any disclaimer, the term of this patent is extended or adjusted under 35 U.S.C. 154(b) by 116 days.

(21) Appl. No.: 18/850,026

(22) PCT Filed: Mar. 23, 2023

(86) PCT No.: PCT/CN2023/083266
§ 371 (c)(1),
(2) Date: Sep. 23, 2024

(87) PCT Pub. No.: WO2023/179699
PCT Pub. Date: Sep. 28, 2023

(65) Prior Publication Data

US 2025/0218118 A1 Jul. 3, 2025

(30) Foreign Application Priority Data

Mar. 23, 2022 (CN) ......................... 202210293514.5

(51) Int. Cl.
*G06T 17/20* (2006.01)

(52) U.S. Cl.
CPC .......... *G06T 17/20* (2013.01); *G06T 2200/04* (2013.01); *G06T 2210/41* (2013.01)

(58) Field of Classification Search
CPC . G06T 17/20; G06T 2200/04; G06T 2210/41; G06T 17/00; G06T 13/40
See application file for complete search history.

(56) References Cited

U.S. PATENT DOCUMENTS

| | | | |
|---|---|---|---|
| 8,535,063 | B1 | 9/2013 | Amato |
| 2020/0060796 | A1 | 2/2020 | Clauss |

(Continued)

FOREIGN PATENT DOCUMENTS

| | | | |
|---|---|---|---|
| CN | 101339670 | A | 1/2009 |
| CN | 102184410 | A | 9/2011 |

(Continued)

OTHER PUBLICATIONS

Li, H.-B. et al., "The preliminary study of three-dimensional simulation of the craniofacial system," Chinese Journal of Stomatology, vol. 40, Issue 5, pp. 405-407 (Sep. 2005).

(Continued)

*Primary Examiner* — Said Broome
*Assistant Examiner* — Andrew Shin
(74) *Attorney, Agent, or Firm* — Maschoff Brennan

(57) ABSTRACT

The present disclosure relates to a method and device for generating a condylar movement envelope surface of a TMJ and its cross-sectional curves based on facial parameters. In the method, reference facial parameters of a TMJ of a healthy person are measured, a matrix is generated based on the reference facial parameters and a reference cross-sectional curve equation of the condylar movement envelope surface, and then a target cross-sectional curve of a specific cross-section of a target condylar movement envelope surface is generated with the matrix and the target facial (Continued)

parameters. Furthermore, a target condylar movement envelope surface may be generated based on a plurality of the target cross-sectional curves.

9 Claims, 3 Drawing Sheets

(56) References Cited

U.S. PATENT DOCUMENTS

| | | | | |
|---|---|---|---|---|
| 2022/0008174 | A1 | 1/2022 | Jaisson | |
| 2023/0240800 | A1* | 8/2023 | Kazarian | A61C 7/002 382/128 |

FOREIGN PATENT DOCUMENTS

| | | | |
|---|---|---|---|
| CN | 103513606 | A | 1/2014 |
| CN | 108113780 | A | 6/2018 |
| CN | 109767841 | A | 5/2019 |
| CN | 110147647 | A | 8/2019 |
| CN | 110390667 | A | 10/2019 |
| CN | 113347943 | A | 9/2021 |
| CN | 113491600 | A | 10/2021 |
| CN | 113963006 | A | 1/2022 |
| CN | 114863056 | A | 8/2022 |
| JP | 2001076172 | A | 3/2001 |
| JP | 2013240534 | A | 12/2013 |

OTHER PUBLICATIONS

Liu, Y. et al., "The Analyse for the Envelope Face Which is Fomed During a Column Face Rotates about a Random Known Axis," Mathematics in Practice and Theory , vol. 35, Issue 11, pp. 136-141 (Nov. 2005).

Huang, C. et al., "A preliminary study on the three-dimensional trajectory of condyle," Chinese Journal of Stomatology, vol. 53, Issue 10, pp. 669-673 (2018).

Osman, F.N. et al., "Computational investigation of the effect of loading conditions on traumatic mandibular fracture," 2019 International Conference on Computer, Control, Electrical, and Electronics Engineering (ICCCEEE) (2019).

Huang, C. et al., "Study on the reconstruction of a four-dimensional movement model and the envelope surface of the condyle in normal adults," British Journal of Oral and Maxillofacial Surgery, vol. 60, pp. 884-889 (2022).

Chinese Office Action dated Sep. 8, 2022 as received in application No. 202210293514.5.

Chinese Notice to Grant Patent dated Oct. 26, 2022 as received in application No. 202210293514.5.

* cited by examiner

METHOD AND DEVICE FOR GENERATING CONDYLAR MOVEMENT ENVELOPE SURFACE OF TEMPOROMANDIBULAR JOINT BASED ON FACIAL PARAMETERS

FIELD OF THE INVENTION

The present disclosure relates to the field of digital healthcare, and in particular to a method and device for generating a condylar movement envelope surface of a temporomandibular joint and its cross-sectional curves based on facial parameters.

BACKGROUND OF THE INVENTION

The temporomandibular joint (TMJ) is the only movable joint in the craniomaxillofacial region and is also one of the most complex joints in the human body. FIG. 1 shows a structural diagram of the TMJ. As shown in FIG. 1, the TMJ mainly includes an articular disc 001, an articular process (condyle process) 002, and an articular fossa 003. The TMJ can perform both sliding and rotational movements, thereby achieving important physiological functions, mainly including opening and closing the mouth, swallowing, chewing, and speaking. For those who cannot function normally due to TMJ defects caused by diseases such as tumors, trauma, infection, and ankylosis, artificial total temporomandibular joint prosthesis replacement (TMJR) is one of the effective methods for TMJ reconstruction developed rapidly in recent years.

At present, artificial TMJ prostheses are generally designed with reference to large joints such as the hip joint, and are mainly designed with a ball-socket relationship or a ball-socket-like relationship. The purpose is to increase the morphological constraints of the articular fossa prosthesis on the articular process prosthesis and prevent dislocation caused by the loss of surrounding tissues around the joint. However, under physiological conditions, the articular process of the TMJ is much smaller than the articular fossa, and with the help of surrounding tissues such as the articular disc, joint capsule, and muscles, TMJ can achieve more flexible movement. Therefore, after the artificial TMJ designed with reference to large joints is implanted and it has been noticed that the postoperative TMJ movement is quite different. The long-term follow-up cases showed that the patient's maximal mouth opening after surgery could not reach the normal value, and lateral movement and protrusion movement were not satisfactory.

In addition to ball-socket joints designed with reference to large joints, existing technologies also have total joint prostheses designed with reference to the bony structure of the normal TMJ, which cannot simulate the function of the articular disc compared with natural joints. Therefore, artificial joint prostheses designed only with reference to the bony structure cannot fully restore the joint movement function, and thus it is difficult to achieve satisfactory clinical results. Follow-up results show that postoperative patients still have significant differences from their physiological state in terms of mouth opening, protrusion, and lateral movement.

Furthermore, for those who undergo unilateral TMJR, due to the inconsistent joint movement, the natural TMJ is subjected to greater force and has a greater change in movement form, thus leading to potential damage to the natural joint.

The condylar movement envelope surface of the TMJ is the boundary range that the condyle can reach during natural movement. The shape of the condylar movement envelope surface of the TMJ can guide the artificial process to move along the functional surface of the fossa, thereby realizing the physiological movement of the mandible.

However, most patients who need TMJR cannot achieve normal mandibular movement due to diseases such as tumors, trauma, infection, and ankylosis, and it is impossible to directly obtain the condylar movement envelope surface data. Therefore, it is urgent to obtain a method for generating the condylar movement envelope surface.

SUMMARY OF THE INVENTION

In order to solve the technical problems existing in the prior art, the applicant has conducted intensive research, measured some facial parameters of TMJ healthy adults, generated a matrix based on the facial parameters, and then used the matrix and the target facial parameters to generate a cross-sectional curve of the target condylar movement envelope surface. Furthermore, the target condylar movement envelope surface can be generated based on cross-sectional curves.

The purpose of this disclosure is to provide the following aspects.

In a first aspect, the present disclosure provides a method for generating a condylar movement envelope surface of a TMJ based on facial parameters, comprising:

- Obtaining a plurality of cross-sectional curve equations of the condylar movement envelope surface of the TMJ;
- Generating a plurality of condylar movement envelope surface curves of the TMJ according to the plurality of cross-sectional curve equations of the condylar movement envelope surface of the TMJ;
- Generating the condylar movement envelope surface of the TMJ according to the plurality of condylar movement envelope surface curves of the TMJ.

In an implementation, the step of obtaining the plurality of cross-sectional curve equations of the condylar movement envelop of the TMJ specifically includes:

- Obtaining target craniofacial features and target facial parameters;
- Obtaining reference facial parameters and reference cross-sectional fitting curve equations in combination with the target craniofacial features;
- Generating a matrix according to the reference facial parameters and the reference cross-sectional fitting curve equations;
- Generating target cross-sectional curve equations according to the matrix and the target facial parameters.

In one implementation, the step of obtaining target craniofacial features includes:

- Obtaining a 3D digital model of a target craniofacial area;
- Extracting target craniofacial features based on the 3D digital model of the target craniofacial area.

In one implementation, the step of obtaining the target facial parameters includes:

- Obtaining a 3D digital model of a target craniofacial area;
- Measuring the 3D digital model of the target craniofacial area to obtain the target facial parameters, wherein the target facial parameters include SNA, SNB, mandibular angle distance, mandibular body length, mandibular plane angle, and an angle between an N-Me line and an FH plane.

In one implementation, the step of obtaining the reference facial parameters includes:

- Obtaining a 3D digital model of a reference craniofacial area;

Measuring the 3D digital model of the reference craniofacial area to obtain the reference facial parameters, wherein the types of the reference facial parameters correspond to and are identical to the types of the target facial parameters.

Optionally, the step of obtaining the 3D digital model of the reference craniofacial area includes:

Obtaining a plurality of candidate craniofacial models;

Generating the 3D digital model of the reference craniofacial area based on the plurality of candidate craniofacial models and according to preset rules.

In one implementation, the step of obtaining the reference cross-sectional fitting curve equations includes:

Obtaining a reference envelope model;

Intercepting the reference envelope surface model with reference cross-sections to form actual curves of the reference cross-sections of the envelope;

Obtaining coordinates of a plurality of feature points on the actual curves of the reference cross-sections of the envelope;

Generating the reference cross-sectional fitting curve equations according to the coordinates of the plurality of the feature points.

In an implementation, the step of generating the target cross-sectional curves according to the matrix and the target facial parameters includes:

Generating the target cross-sectional curve equations by performing an inverse operation with the target facial parameters and the matrix;

Drawing the target cross-sectional curves according to the target cross-sectional curve equations.

In a second aspect, the present disclosure further provides a device for generating a condylar movement envelope surface of a TMJ based on facial parameters, comprising:

A cross-sectional curve equation generating unit, configured for generating a plurality of cross-sectional curve equations of the condylar movement envelope surface of the TMJ;

A curved surface equation generating unit, configured for generating a plurality of condylar movement envelope surface curves of the TMJ according to the plurality of cross-sectional curve equations of the condylar movement envelope surface of the TMJ;

A curved surface generating unit, configured for generating the condylar movement envelope surface of the TMJ according to the plurality of the condylar movement envelope surface curves of the TMJ.

In a third aspect, the present disclosure also provides a program for generating a condylar movement envelope surface of a TMJ based on facial parameters, wherein the program is configured to implement the steps of the method for generating the condylar movement envelope surface of the TMJ as described in the first aspect when executed.

In a fourth aspect, a computer-readable storage medium is provided, which stores computer instructions configured to implement the steps of the method for generating the condylar movement envelope surface of the TMJ as described in the first aspect when executed by a processor.

In a fifth aspect, a detection device is provided, which comprises: at least one processor; and a memory communicatively connected to the at least one processor; wherein the memory stores instructions executable by the at least one processor, and the instructions are executed by the at least one processor so that the at least one processor performs the method for generating the condylar movement envelope surface of the TMJ as described in the first aspect.

In a sixth aspect, the present disclosure further provides a method for generating a cross-sectional curve of a condylar movement envelope surface of a TMJ based on facial parameters, comprising:

Obtaining target craniofacial features and target facial parameters;

Obtaining reference facial parameters and a reference cross-sectional fitting curve equation in combination with the target craniofacial features;

Generating a matrix according to the reference facial parameters and the reference cross-sectional fitting curve equation;

Generating a target cross-sectional curve according to the matrix and the target facial parameters.

In one implementation, the step of obtaining the target craniofacial features includes:

Obtaining a 3D digital model of a target craniofacial area;

Extracting target craniofacial features based on the 3D digital model of the target craniofacial area.

In one implementation, the step of obtaining the target facial parameters includes:

Obtaining a 3D digital model of a target craniofacial area;

Measuring the 3D digital model of the target craniofacial area to obtain target facial parameters, wherein the target facial parameters include SNA, SNB, mandibular angle distance, mandibular body length, mandibular plane angle, and an angle between an N-Me line and an FH plane.

In one implementation, the step of obtaining the reference facial parameters includes: Obtaining a 3D digital model of a reference craniofacial area;

Measuring the 3D digital model of the reference craniofacial area to obtain the reference facial parameters, wherein the types of the reference facial parameters correspond to and are identical to the types of the target facial parameters.

Optionally, the step of obtaining the 3D digital model of the reference craniofacial area includes:

Obtaining a plurality of candidate craniofacial models;

Generating the 3D digital model of the reference craniofacial area based on the plurality of candidate craniofacial models and according to preset rules.

In one implementation, the step of obtaining the reference cross-sectional fitting curve equations includes:

Obtaining a reference envelope model;

Intercepting the reference envelope model with a reference cross-section to form an actual reference cross-sectional curve of the envelope;

Obtaining coordinates of a plurality of feature points on the actual reference cross-sectional curve of the envelope;

Generating the reference cross-sectional fitting curve equation according to the coordinates of the plurality of the feature points.

In an implementation, the step of generating the target cross-sectional curve according to the matrix and the target facial parameters includes:

Generating the target cross-sectional curve equation by performing an inverse operation with the target facial parameters and the matrix;

Drawing the target cross-sectional curves according to the target cross-sectional curve equations.

In a seventh aspect, the present disclosure further provides a device for generating a cross-sectional curve of a condylar movement envelope surface of a TMJ based on facial parameters, comprising:

A parameter acquisition unit, configured for acquiring target craniofacial features and target facial parameters;

A curve equation fitting unit, configured for obtaining reference facial parameters and a reference cross-sectional fitting curve equation in combination with the target craniofacial features;

A matrix generating unit, configured for generating a matrix according to the reference facial parameters and the reference cross-sectional fitting curve equation;

Wherein the curve equation fitting unit is also configured for generating a target cross-sectional curve according to the matrix and the target facial parameters.

In an eighth aspect, the present disclosure also provides a program for generating cross-sectional curves of a condylar movement envelope surface of a TMJ based on facial parameters, wherein the program is configured to implement the steps of the method for generating cross-sectional curves of the condylar movement envelope surface of the TMJ based on facial parameters as described in the sixth aspect when executed.

In a ninth aspect, a computer-readable storage medium is provided, which stores computer instructions configured to implement the steps of the method for generating cross-sectional curves of the condylar movement envelope surface of the TMJ based on facial parameters as described in the sixth aspect when executed by a processor.

In the tenth aspect, a detection device is provided, which comprises: at least one processor; and a memory communicatively connected to the at least one processor; wherein the memory stores instructions executable by the at least one processor, and the instructions are executed by the at least one processor so that the at least one processor performs the method for generating cross-sectional curves of the condylar movement envelope surface of the TMJ based on facial parameters as described in the sixth aspect.

Compared with the prior art, the method provided in the present disclosure is based on the matrix representation theory of linear transformation. It first generates a mapping relationship between the measurable facial parameters in the skull model represented in matrix form and the coefficients of the cross-sectional curves of condylar movement envelope surface of the TMJ. Then, based on the measurable facial parameters in the target skull model, the matrix is used to perform inverse operations to generate cross-sectional curves of the condylar movement envelope surface of the TMJ, thereby achieving the goal of generating relatively accurate cross-sectional curves of the movement envelope using only static parameters. Based on this, it is possible to more accurately generate various parameters of the condylar movement envelope surface in a healthy state that cannot be collected due to various reasons.

Furthermore, according to the method provided in the present disclosure, it is simple and easy to collect physical parameters, and all parameters are collected non-invasively. Further, the collection of each parameter can be assisted by routine inspection results without the need for special parameter collection. In addition, the overall calculation load of the scheme is small, and the target cross-sectional curves of the envelope and the target envelope can be quickly determined.

BRIEF DESCRIPTION OF THE DRAWINGS

FIG. 2-1 is a 3D structural diagram showing a condylar movement envelope surface of a healthy TMJ;

FIG. 2-2 is a 3D structural grid diagram of the condylar movement envelope surface shown in FIG. 2-1;

FIG. 4-1 is a sagittal cross-sectional front view of the envelope shown in FIG. 2-1;

FIG. 4-2 is a 3D structural diagram showing the structure of FIG. 4-1;

DETAILED DESCRIPTION OF THE EMBODIMENTS

First, a brief introduction to the usage scenarios of this solution is given.

Figure 1:
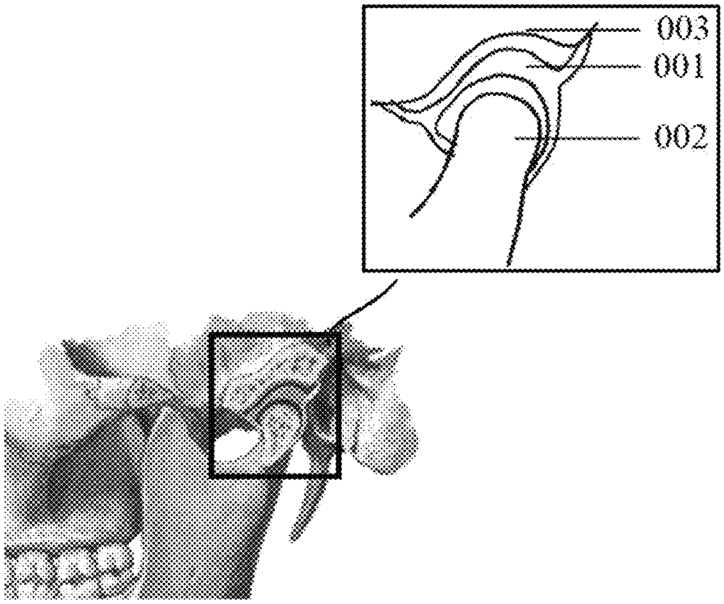
FIG. 1 shows a structural diagram of the TMJ.

As shown in FIG. 1, for a healthy person, the TMJ mainly includes an articular disc 001, an articular process 002 and an articular fossa 003, wherein the articular process 002 can slide or rotate in the articular fossa 003 under the traction and restriction of the articular disc 001, thereby realizing various physiological functions of the mandible, such as closing the mouth, swallowing, chewing or speaking.

In the present disclosure, the term "condyle of the TMJ" and the term "articular process" refer to the same thing, that is, both refer to the same physiological position and structure.

Figures 1, 2:
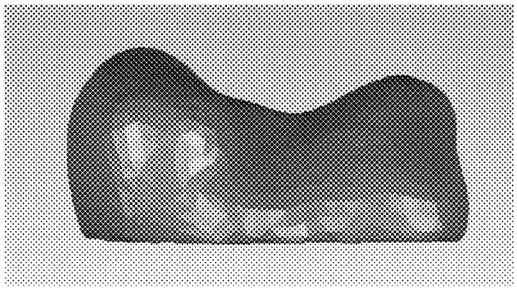
Figure 2:
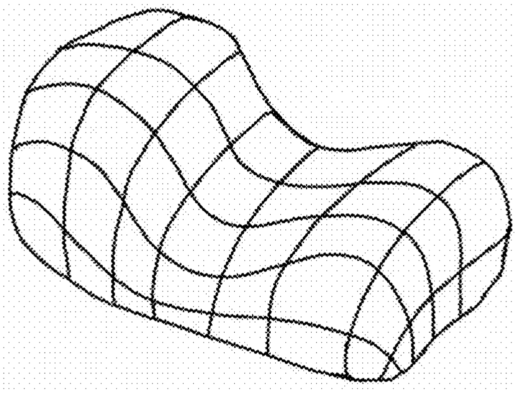

FIG. 2-1 is a 3D (i.e., three-dimension) structural diagram showing a condylar movement envelope surface of a healthy TMJ, and FIG. 2-2 is a 3D structural grid diagram of the articular process movement envelope shown in FIG. 2-1. As shown in FIG. 2-1 and FIG. 2-2, the movement trajectory of the healthy articular process in the articular fossa is difficult to express with a simple mathematical expression.

In the present disclosure, the condylar movement envelope surface of the TMJ (hereinafter referred to as "envelope" for convenience) refers to the movement boundary of the articular process of the TMJ during various movements of the TMJ. In fact, at the maximum opening, part of the structure of the articular process exceeds the corresponding articular fossa.

As can be seen from FIG. 2-1 and FIG. 2-2, the envelope is an irregular and uneven surface, and, from a 3D perspective, the envelope forms an irregular socket-like structure, but the socket-like structure is not the same as the structure of the bony articular fossa.

It is understandable that for patients who need total TMJ replacement, it is difficult to predetermine the envelope in a healthy state after the illness has been removed. Since the morphology of the envelope is a key parameter in designing an artificial TMJ prosthesis, it is particularly important in practice to predetermine a relatively accurate envelope morphology.

Based on this, the present disclosure provides a method for generating a cross-sectional curve of the condylar movement envelope surface of the TMJ based on facial parameters. Specifically, the cross-sectional curve of the condylar movement envelope surface of the TMJ of the reference head on a specific cross-section is first mathematically expressed, and then a matrix of "facial parameters-envelope sagittal cross-section" is generated using a matrix method, and then the matrix is used to calculate the mathematical expression of the cross-sectional curve of the condylar movement envelope surface of the TMJ of the target head on the corresponding cross-section according to the corresponding facial parameters of the target head.

Furthermore, based on the cross-sectional curve of condylar movement envelope surface of the TMJ, an expression of the corresponding envelope can be generated, and the corresponding morphology can be drawn.

Figure 3:
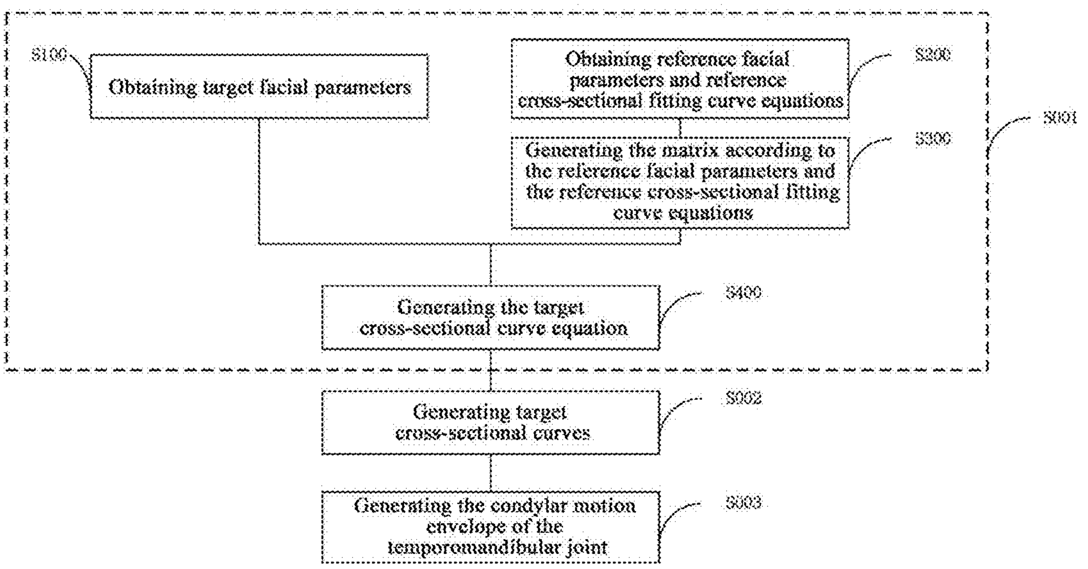
FIG. 3 shows a flow chart of a method for generating cross-sectional curves of a condylar movement envelope surface of a TMJ based on facial parameters provided in the present disclosure.

Specifically, FIG. 3 shows a flow chart of a method for generating a condylar movement envelope surface of a TMJ based on facial parameters provided in the present disclosure. As shown in FIG. 3, the method includes the following steps S001 to S003:

S001, obtaining a plurality of cross-sectional curve equations of the condylar movement envelope surface of the TMJ;

S002, generating condylar movement envelope surface curves of the TMJ according to the plurality of cross-sectional curve equations of the condylar movement envelope surface of TMJ;

S003, generating the condylar movement envelope surface of the TMJ according to the condylar movement envelope surface curves of the TMJ.

In this example, step S001 may specifically include the following steps S100 to S400:

S100, obtaining target craniofacial features and target facial parameters.

In this example, the step of obtaining the target craniofacial features may specifically include the following steps S111 and S112:

Step S111, obtaining a 3D digital model of a target craniofacial area.

In this example, the 3D digital model of the target craniofacial area can be reconstructed using computer-aided means based on the two-dimensional digital information of a target skull.

Step S112, extracting target craniofacial features based on the 3D digital model of the target craniofacial area.

In this example, the target craniofacial features refer to craniofacial features extracted from the 3D digital model of the target skull, and the craniofacial features can be considered as craniofacial features of the target object.

Furthermore, the craniofacial features can be specifically set according to specific needs. For example, the craniofacial features may include the length and the width of the face, and the anterior-posterior position relationship of the upper and lower jaws, among which specific parameters for determining the length and the width of the face, and the anterior-posterior position relationship of the upper and lower jaws can be specifically set according to needs.

Furthermore, the aforementioned craniofacial features can be further divided into multiple sub-features.

It is understandable that, according to specific needs, the craniofacial features may also include other parameters.

In this example, the target surface parameters refer to surface parameters extracted from the target 3D digital model.

In this example, the facial parameters are different from the craniofacial features, wherein the craniofacial features are the basis for qualitatively dividing craniofacial types, while the facial parameters are extracted from the 3D digital model of the craniofacial area and can reflect the quantitative data of the facial features of the collected object.

In this example, the step of obtaining the target facial parameters may specifically include the following steps S121 and S122:

Step S121, obtaining a 3D digital model of a target craniofacial area.

In this example, this step can directly call the 3D digital model of the target craniofacial area generated in step S111 to avoid repetitive calculations.

Step S122, measuring target facial parameters based on the 3D digital model of the target craniofacial area, wherein the target facial parameters include corresponding parameters of the TMJ and muscle-related parameters, such as SNA, SNB, mandibular angle distance, mandibular body length, mandibular plane angle, and the angle between the N-Me line and the FH plane.

It can be understood that the target facial parameters may also include other parameters that can predict the envelope morphology.

In this example, the target facial parameters can be measured using any method in the prior art that can measure data based on a 3D digital model. For example, PROPLAN CMF software can be used to perform cephalometric measurement on the 3D digital model of a target skull to obtain the target facial parameters.

S200, obtaining reference facial parameters and reference cross-sectional fitting curve equations.

In the present disclosure, the reference facial parameters are facial parameters obtained based on a reference craniofacial 3D digital model, wherein the reference skull 3D digital model is obtained based on a skull 3D digital model of a healthy population.

In the present disclosure, for the convenience of expression, the skull 3D digital model of a healthy person is referred to as an alternative skull 3D digital model. The alternative skull 3D digital model can be stored in an alternative model library, which includes an effective number of alternative skull 3D digital models, for example, there is at least one alternative skull 3D digital model for each face shape.

Optionally, the reconstruction method of the candidate skull 3D digital model is the same as the reconstruction method of the target skull 3D digital model, which simplifies the processing operation and makes the data of the two comparable.

In this example, the alternative skull 3D digital model can be directly selected from the skull 3D digital model of a healthy population, and can also be a 3D digital model obtained by performing further calibration according to the 3D digitized physical model of the upper and lower jaws based on the skull 3D digital model of a healthy population. The digitized physical models of the upper and lower jaws may include a scanned model of a plaster cast, or a digital model obtained by scanning the oral cavity of the object.

Specifically, the step of calibrating the candidate skull 3D digital model according to the digitized physical model of the upper and lower jaws specifically includes the following steps S201 to S202:

Step S201, obtaining a standard dentition 3D model of the upper and lower jaws and the mandibular movement trajectory.

In one implementation, a plaster cast may be used to obtain the standard dentition 3D model of the upper and lower jaws, which may specifically include the following steps:

Making separable upper and lower jaw physical models of the acquisition object, wherein the upper and lower jaw physical models can be separated into an upper jaw physical model and a lower jaw physical model that are mutually independent;

Scanning the upper and lower jaw physical models with a scanner to obtain the standard dentition 3D model of the upper and lower jaws.

The step of scanning the upper and lower jaw models with a scanner specifically includes:

Scanning the upper and lower jaw physical models in an occlusal state to obtain the 3D models of the occluding upper and lower jaws;

Scanning the upper jaw model and the lower jaw model separately to obtain an upper jaw 3D model and a lower jaw 3D model respectively;

Obtaining standard upper and lower jaw 3D models by occlusal simulation of the upper jaw 3D model and the lower jaw 3D model according to the occlusal relationship of the 3D models of the occluding upper and lower jaws.

In another implementation, the standard dentition 3D models of the upper and lower jaws may be obtained by scanning the oral cavity of an object, which may specifically include the following steps:

Scanning the inside of the mouth of a collection object with an oral scanner to obtain a standard dentition 3D model of the upper and lower jaws.

In this example, the method for obtaining the mandibular movement trajectory may adopt any method for obtaining the mandibular movement trajectory in the prior art. For example, obtaining the mandibular movement trajectory may specifically include the following steps:

Making an upper dentition jaw pad and a lower dentition jaw pad of the collection object, wherein an upper target is arranged at the front dentition of the upper dentition jaw pad, and a lower target is arranged at the front dentition of the lower dentition jaw pad;

Placing the upper dentition jaw pad and the lower dentition jaw pad on the collection object, and tracking the upper target and the lower target with a mandibular movement trajectory scanner to obtain the mandibular movement trajectory.

In step S202, using the mesio-incisal angle of the incisor and the mesial cusps of the left and right first molars as reference points, the standard dentition 3D model of the upper and lower jaws is matched with the alternative craniofacial 3D digital model to obtain a calibrated craniofacial 3D digital model.

In this example, if the alternative craniofacial 3D digital model is calibrated to obtain a calibrated craniofacial 3D digital model, the calibrated craniofacial 3D digital model is used to replace the corresponding alternative craniofacial 3D digital model in the alternative model library, thereby updating the information in the alternative model library.

In this example, the software for executing this step may be any software in the prior art that can execute the above operations, for example, Geomagic Studio software.

In this example, the step of obtaining the reference facial parameters may specifically include the following steps S211 to S212:

Step S211, obtaining a reference craniofacial 3D digital model.

In this example, the reference craniofacial 3D digital model can be obtained by at least the following two schemes:

The first scheme is directly selecting the reference craniofacial 3D digital model from a plurality of candidate craniofacial 3D digital models;

The second scheme is to fuse a plurality of candidate craniofacial 3D digital models to generate the reference craniofacial 3D digital model.

In the first scheme, the step S211 may specifically include the following steps S2111 and S2112:

Step S2111, obtaining a plurality of candidate craniofacial models.

In this scheme, the candidate craniofacial model is selected from the alternative craniofacial model, and the candidate craniofacial model and the target craniofacial model meet the first screening rule, thereby achieving preliminary screening of the alternative craniofacial model.

In this scheme, the first screening rule can be specifically formulated according to specific needs. For example, the alternative craniofacial models are divided into eight categories according to the length and the width of the face, and the anterior-posterior position relationship of the upper and lower jaws, and the first screening rule is: a category of alternative craniofacial models with the same facial features as the target skull.

It is understandable that the first screening rule may also be other rules that can screen out corresponding candidate craniofacial models from the alternative craniofacial models according to specific needs, so that the candidate craniofacial models have a higher degree of similarity with the target craniofacial model.

Step S2112, generating a reference craniofacial 3D digital model based on the candidate craniofacial model according to a first conversion rule.

In this scheme, the first conversion rule is to select a candidate craniofacial model with the highest similarity to the target craniofacial model from the alternative craniofacial models as the reference craniofacial 3D digital model without performing any data processing on the candidate craniofacial models.

In this scheme, the first conversion rule is to select the candidate craniofacial model with the highest similarity to the target craniofacial 3D digital model.

Furthermore, the present scheme does not impose any limitation on the method for calculating the similarity between the target craniofacial 3D digital model and the candidate craniofacial model, and any method for calculating the similarity between two 3D digital models in the prior art can be used, for example, the method for retrieving similar models in the craniofacial 3D morphological database disclosed in Chinese patent application CN109767841A.

In this example, the sampling points used to calculate the similarity between two 3D digital models can be specifically set according to specific needs.

In the second scheme, the step S211 may specifically include the following steps S2113 and S2114:

Step S2113, obtaining a plurality of candidate craniofacial models.

In this scheme, the candidate craniofacial model is selected from the alternative craniofacial model, and the candidate craniofacial model and the target craniofacial model satisfy the second screening rule, thereby achieving preliminary screening of the alternative craniofacial model.

In this example, the second screening rule may be the same as the first screening rule or may be different from the first screening rule, so as to screen out candidate craniofacial models that can be more accurately fused into a reference craniofacial 3D digital model in the second scheme.

In one implementation, the second screening rule may be that the corresponding parameters satisfy a preset condition, wherein the corresponding parameters include the line distance and the angle representing the face shape, and the preset condition is that they are identical or meet a preset threshold range.

Step S2114, generating a reference craniofacial 3D digital model based on the candidate craniofacial model according to a second conversion rule.

In this scheme, the second conversion rule may include the following steps:

Comparing each of the candidate craniofacial models with the target craniofacial 3D digital model respectively;

Intercepting the region of each candidate craniofacial model that is most similar to the target craniofacial model to obtain a plurality of modules to be fused;

Fusing the modules to be fused to generate the reference craniofacial 3D digital model.

In this scheme, the modules to be fused are fused together to obtain a complete craniofacial 3D digital model.

Step S212, measuring the reference craniofacial 3D digital model to obtain reference facial parameters, wherein the types of the reference facial parameters correspond to and are identical to the types of the target facial parameters.

In this example, the reference craniofacial 3D digital model is measured to obtain reference facial parameters. Preferably, the method used to measure the reference craniofacial 3D digital model is the same as the method used to measure the target craniofacial 3D digital model. For example, in this example, PROPLAN CMF software is used for cephalometric measurement.

Furthermore, the sampling points of the two also correspond to each other and are identical, so that the collected initial data are comparable. For example, in this example, the data may be traditional cephalometric parameters and TMJ parameters.

In this example, generating the reference cross-sectional fitting curve equation may specifically include the following steps S221 to S224:

Step S221, obtaining a reference envelope model.

In this example, the reference envelope model is an envelope formed by the movement of the condyle of the TMJ in the reference craniofacial 3D digital model.

In this example, the reference envelope model may be calculated based on the reference craniofacial 3D digital model and the mandibular movement trajectory. Specifically, the following steps S2211 to S2212 may be included:

Step S2211, matching the mandibular movement trajectory with the corresponding alternative craniofacial 3D digital model.

In this example, the matching refers to the process of matching the mandibular movement data with the target skull 3D digital model through the standard dentition 3D model of the upper and lower jaws, and aligning the mandibular movement trajectory with the target skull 3D digital model in a unified coordinate system.

The present disclosure does not specifically limit the software used to perform this step, and any software in the prior art that can perform the above steps can be used, for example, Geomagic Studio software.

Step S2212, calculating and generating the reference envelope model according to the mandibular movement trajectory and the condylar movement functional surface preset on the alternative craniofacial 3D digital model.

In this example, after the condylar movement functional surface is matched, the condylar movement envelope surface of the mandible is obtained through computer simulation. Specifically, the mandible can be moved in a preset sequence, the position of the mandibular movement trajectory at each moment is saved, the positions are superimposed, and the result is the condylar movement envelope surface.

In this example, the specific implementation of this step can adopt any method that can implement this step in the prior art.

Step S222, intercepting the reference envelope model with a reference cross-section to form an actual reference cross-sectional curve of the envelope.

In this example, any method in the prior art for plane interception of a 3D digital model may be used. For example, the above solution may be implemented using Geomagic software.

For ease of explanation, in this example, the sagittal plane is used as an example of the reference cross-section.

The applicant has found that using the sagittal plane as the reference cross-section plays an important role in completing the target envelope cross-sectional curve and the target envelope model, and also provides an important reference for establishing the target functional surface of the articular fossa.

It can be understood that, in this scheme, other cross-sections can also be used to intercept the reference envelope model, and other cross-sections can be not only coronal cross-sections but also planes at other angles.

Specifically, the reference envelope model obtained in step S221 is imported into Geomagic software, and the direction of the reference envelope is adjusted in the software, and then the horizontal plane section function is used to perform a sagittal section on the reference envelope. Furthermore, based on the sagittal section, the cross-sectional curve of the reference envelope model on the sagittal section is extracted, and the cross-sectional curve is saved in an "obj." format.

Figures 1, 4:
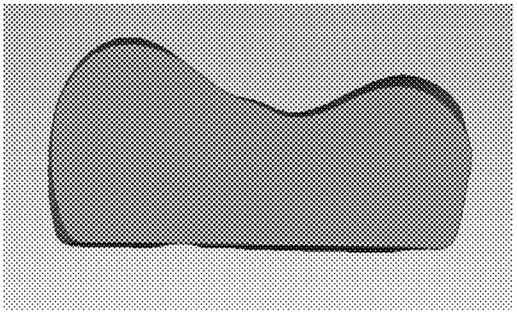
Figures 2, 4:
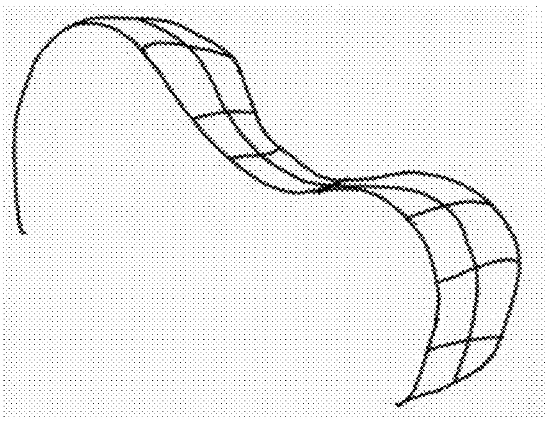

FIG. 4-1 is a sagittal cross-sectional front view of the envelope shown in FIG. 2-1, and FIG. 4-2 is a 3D structural diagram showing the structure of FIG. 4-1. As shown in FIG. 4-1 and FIG. 4-2, in this example, the cross-sectional curve obtained in this step is approximately a double-peak curve.

Step S223, obtaining the coordinates of a plurality of feature points on the actual reference cross-sectional curve of the envelope.

In this example, the cross-sectional curve extracted in step S222 is opened in a "txt." format, and the coordinates of a plurality of feature points are extracted on the cross-sectional curve.

Specifically, in this example, the feature point coordinates can be imported into MATLAB software, and the spatial coordinates of the feature points can be converted into two-dimensional plane point coordinates, and then the cross-sectional curve is rotated clockwise or counterclockwise with the Orbital-Ear Plane as the reference plane, to obtain the point coordinates of the cross-sectional curve in the xy plane when the Orbital-Ear Plane is parallel to the x-axis. The coordinates used in the subsequent steps are the point coordinates of the cross-sectional curve.

The coordinates of feature points are selected on the processed cross-sectional curve. In this example, the number of the feature points and the five types of selected points can be specifically set according to the specific shape of the cross-sectional curve.

For example, for the cross-sectional curve shown in FIG. 4-2, at least the following ten feature points are extracted: feature point (1) is the highest point of the first bulge from the left, and this point is determined as the origin of the proposed new two-dimensional coordinate system; feature point (2) is the lowest point of the depression between the two peaks; feature point (3) is the highest point of the second bulge from the left; feature point (4) is a point near $x=-2$ in the proposed new two-dimensional coordinate system; feature point (5) and feature point (6) are two points of the cross-sectional curve between feature point (1) and feature point (2); feature point (7) and feature point (8) are two points of the cross-sectional curve between feature point (2) and feature point (3); feature point (9) and feature point (10) are two points of the cross-sectional curve in the positive x direction of feature point (3) in the proposed new two-dimensional coordinate system.

Step S224, generating a reference cross-sectional fitting curve equation according to the coordinates of the plurality of feature points.

Figure 5:
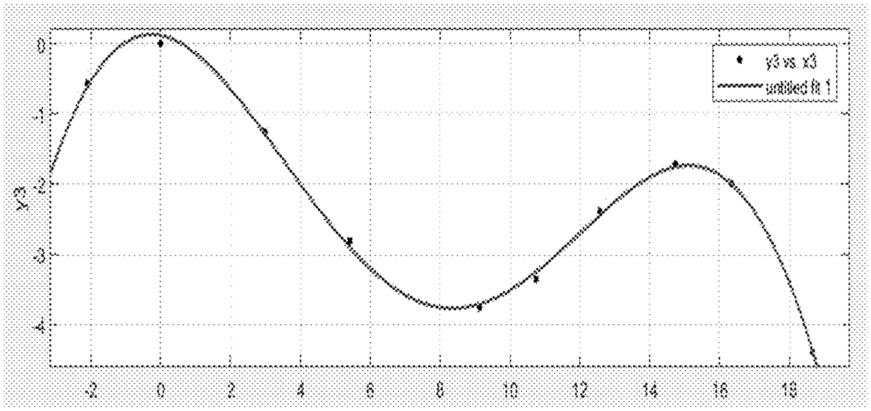
FIG. 5 shows a fitting curve obtained by fitting the cross-sectional curves shown in FIG. 4-1 and FIG. 4-2.

FIG. 5 shows a fitting curve obtained by fitting the cross-sectional curves shown in FIG. 4-1 and FIG. 4-2. In this example, MATLAB is used to fit the feature point coordinates obtained in step S223, as shown in FIG. 5, to generate a reference cross-sectional fitting curve and the equation of the reference cross-sectional fitting curve.

In this example, Fourier transform may be used to generate a reference cross-sectional fitting curve in the step.

In this example, the reference cross-sectional fitting curve may be pre-stored in a database, and in subsequent process, the reference cross-sectional fitting curve corresponding to the target skull model type may be directly retrieved according to the target skull type.

Accordingly, in this example, the matrix may also be pre-stored in the database, and in subsequent process, the matrix corresponding to the target skull model type may be directly retrieved according to the target skull type.

It is understandable that the reference cross-sectional fitting curve and the matrix pre-stored in the database can be updated at any time as needed.

S300, generating a matrix according to the reference facial parameters and the reference cross-sectional fitting curve equation.

In this example, the specific implementation of this step can adopt any method for generating a corresponding matrix according to parameters and corresponding fitting curves in the prior art.

For example, the parameters in the reference cross-sectional fitting curve equation are extracted, and the reference facial parameters and the parameters of the reference cross-sectional fitting curve equation are input into MATLAB, and then the matrix of the two are calculated.

S400, generating a target cross-sectional curve equation according to the matrix and the target facial parameters.

In this example, this step may specifically include the following steps S401 and S402:

Step S401, generating the target cross-sectional curve equation by performing an inverse operation with the target facial parameters and the matrix.

In this example, the specific implementation of this step may be the inverse operation of step S300.

For example, the target surface parameters are input into MATLAB, the matrix is used to calculate and generate the parameters of the target cross-section curve equation, and then the parameters are used to generate the target cross-section curve equation.

Step S402: drawing a target cross-sectional curve according to the target cross-section curve equation.

In this example, data processing software is used to generate a target cross-sectional curve equation based on the parameters to generate the target cross-sectional curve, that is, to predict the target cross-sectional curve.

The method provided in the present disclosure simplifies the 3D morphology of the envelope into the two-dimensional shape of the sagittal cross-sectional curve of the envelope. The curve has regularity, and its mathematical expression and prediction have extremely high application value, and can realize the prediction of the envelope morphology of an individual.

In the present disclosure, the specific implementation of step S002 is not particularly limited, and any method in the prior art for generating a surface including a plurality of curves based on the plurality of curves can be used.

In the present disclosure, the specific implementation of step S003 is not particularly limited, and any method in the prior art that can generate a corresponding curved surface according to a curved surface equation can be used. It is understandable that the above solution can be implemented with the help of any software in the prior art.

Furthermore, the generating of the condylar movement envelope surface of the TMJ may be understood as drawing the condylar movement envelope surface of the TMJ.

Accordingly, the present disclosure also provides a device for generating a cross-sectional curve of a condylar movement envelope surface of a TMJ based on facial parameters, wherein the device comprises:

A cross-sectional curve equation generating unit, configured for generating a plurality of cross-sectional curve equations of the condylar movement envelope surface of the TMJ according to the aforementioned method;

A curve generating unit, configured for generating a plurality of curves of the condylar movement envelope surface of the TMJ according to the plurality of the cross-sectional curve equations of the condylar movement envelope surface of the TMJ;

A curved surface generating unit, configured for generating the condylar movement envelope surface of the TMJ according to the plurality of curves of the condylar movement envelope surface of the TMJ.

The present disclosure also provides a method for generating a cross-sectional curve of a condylar movement envelope surface of a TMJ based on facial parameters, wherein the method comprises:

Obtaining target craniofacial features and target facial parameters;

Obtaining reference facial parameters and reference cross-sectional fitting curve equations in combination with the target craniofacial features;

Generating a matrix according to the reference facial parameters and the reference cross-sectional fitting curve equations;

Generating a target cross-section curve according to the matrix and the target facial parameters.

In this example, each step in the method for generating a cross-sectional curve of a condylar movement envelop of a TMJ based on facial parameters corresponds to the same specific implementation as the aforementioned steps S100 to S400, and will not be repeated here.

The present disclosure also provides a device for generating a cross-sectional curve of a condylar movement envelope surface of a TMJ based on facial parameters, wherein the device comprises:

A parameter acquisition unit, configured for acquiring target craniofacial features and target facial parameters;

A curve equation fitting unit, configured for obtaining reference facial parameters and reference cross-sectional fitting curve equations in combination with the target craniofacial features;

A matrix generating unit, configured for generating a matrix according to the reference facial parameters and the reference cross-sectional fitting curve equations;

Wherein the curve equation fitting unit is also configured for generating a target cross-sectional curve according to the matrix and the target facial parameters.

In the present disclosure, each unit is specifically configured to implement a scheme of each corresponding step.

The method provided in the present disclosure uses reference facial parameters and reference cross-sectional curves to generate a matrix, and uses the matrix as a conversion medium for generating a target cross-sectional curve of the condylar movement envelope surface. After determining the facial parameters of the target skull, the target cross-sectional curve is obtained by reversible operation of the matrix. Furthermore, multiple target cross-sectional curves are obtained based on the facial parameters of the same target skull, and the multiple target cross-sectional curves can form a target condylar movement envelope surface.

The method provided in the present disclosure simplifies the morphology of the condylar movement envelope surface of the TMJ and covers its main morphological features. Furthermore, a mathematical expression of the condylar movement envelope surface of the TMJ in the above-mentioned simplified morphology is proposed, so that the morphological information of the condylar movement envelope surface of the TMJ can be quantitatively studied.

It can be understood that the method provided in the present disclosure can generate a cross-sectional curve on any cross-section of the target condylar movement envelope surface, for example, a cross-sectional curve of the target condylar movement envelope surface on a sagittal cross-section of the target skull, or a cross-sectional curve of the target condylar movement envelope surface on other representative cross-sections of the target skull.

What is claimed is:

1. A method for generating a condylar movement envelope surface of a temporomandibular joint (TMJ) based on facial parameters, comprising:

- obtaining a plurality of cross-sectional curve equations of the condylar movement envelope surface of the TMJ by:
  - obtaining target craniofacial features and target facial parameters;
  - obtaining reference facial parameters and reference cross-sectional fitting curve equations in combination with the target craniofacial features;
  - generating a matrix according to the reference facial parameters and the reference cross-sectional fitting curve equations; and
  - generating target cross-sectional curve equations according to the matrix and target surface parameters;
- generating a plurality of condylar movement envelope surface curves of the TMJ according to the plurality of cross-sectional curve equations of the condylar movement envelope surface of the TMJ; and
- generating the condylar movement envelope surface of the TMJ according to the plurality of condylar movement envelope surface curves of the TMJ.

2. The method according to claim 1, wherein the step of obtaining the target craniofacial features comprises: obtaining a 3D digital model of a target craniofacial area; and extracting target craniofacial features based on the 3D digital model of the target craniofacial area.

3. The method according to claim 1, wherein the step of obtaining target facial parameters comprises: obtaining a 3D digital model of the target craniofacial area; and measuring the 3D digital model of the target craniofacial area to obtain target the facial parameters, wherein the target facial parameters include SNA, SNB, mandibular angle distance, mandibular body length, mandibular plane angle, and an angle between an N-Me line and an FH plane.

4. The method according to claim 1, wherein the step of obtaining the reference facial parameters comprises: obtaining a 3D digital model of a reference craniofacial area; and measuring the 3D digital model of the reference craniofacial area to obtain the reference facial parameters, wherein the types of the reference facial parameters correspond to and are identical to the types of the target facial parameters.

5. The method according to claim 1, wherein the step of obtaining the 3D digital model of the reference craniofacial area comprises: obtaining a plurality of candidate craniofacial models; and generating the 3D digital model of the reference craniofacial area based on the plurality of candidate craniofacial models and according to preset rules.

6. The method according to claim 1, wherein the step of obtaining the reference cross-sectional fitting curve equations comprises: obtaining a reference envelope model; intercepting the reference envelop model with reference cross-sections to form actual curves of the reference cross-sections of the envelope; obtaining coordinates of a plurality of feature points on the actual curves of the reference cross-sections of the envelope; and generating the reference cross-sectional fitting curve equations according to the coordinates of the plurality of the feature points.

7. A device for generating a condylar movement envelope surface of a temporomandibular joint (TMJ) based on facial parameters, comprising a non-transitory computer-readable storage medium on which computer instructions are stored, wherein the computer instructions, when executed by a processor, implement the following steps:

- generating a plurality of cross-sectional curve equations of the condylar movement envelope surface of the TMJ by:
  - obtaining target craniofacial features and target facial parameters;
  - obtaining reference facial parameters and reference cross-sectional fitting curve equations in combination with the target craniofacial features;
  - generating a matrix according to the reference facial parameters and the reference cross-sectional fitting curve equations; and
  - generating target cross-sectional curve equations according to the matrix and target surface parameters;
- generating a plurality of condylar movement envelope surface curves of the TMJ according to the plurality of cross-sectional curve equations of the condylar movement envelope surface of the TMJ; and
- generating the condylar movement envelope surface of the TMJ according to the plurality of the condylar movement envelope surface curves of the TMJ.

8. A method for generating a cross-sectional curve of a condylar movement envelope surface of a temporomandibular joint (TMJ) based on facial parameters, comprising:

- obtaining target craniofacial features and target facial parameters;
- obtaining reference facial parameters and a reference cross-sectional fitting curve equation in combination with the target craniofacial features;
- generating a matrix according to the reference facial parameters and the reference cross-sectional fitting curve equation; and
- generating a target cross-sectional curve according to the matrix and the target surface parameters.

9. A device for generating a cross-sectional curve of a condylar movement envelope surface of a temporomandibular joint (TMJ) based on facial parameters, comprising a non-transitory computer-readable storage medium on which computer instructions are stored, wherein the computer instructions, when executed by a processor, implement the following steps:

acquiring target craniofacial features and target facial parameters;

obtaining reference facial parameters and a reference cross-sectional fitting curve equation in combination with the target craniofacial features;

generating a matrix according to the reference facial parameters and the reference cross-sectional fitting curve equation; and generating a target cross-sectional curve according to the matrix and the target facial parameters.

* * * * *